(12) United States Patent
Zou et al.

(10) Patent No.: US 10,746,357 B2
(45) Date of Patent: Aug. 18, 2020

(54) LIGHTING DEVICE HAVING POLYCHROMATIC LIGHT SOURCE AND OPTICAL ELEMENT WITH LIGHT FILTER HAVING THROUGH HOLE

(71) Applicant: YLX Incorporated, Shenzhen (CN)

(72) Inventors: Siyuan Zou, Shenzhen (CN); Quan Zhang, Shenzhen (CN); Yi Li, Shenzhen (CN)

(73) Assignee: YLX Incorporated, Shenzhen (CN)

( * ) Notice: Subject to any disclaimer, the term of this patent is extended or adjusted under 35 U.S.C. 154(b) by 0 days.

(21) Appl. No.: 15/779,818

(22) PCT Filed: Nov. 30, 2016

(86) PCT No.: PCT/CN2016/107942
§ 371 (c)(1),
(2) Date: May 29, 2018

(87) PCT Pub. No.: WO2017/092665
PCT Pub. Date: Jun. 8, 2017

(65) Prior Publication Data
US 2018/0259138 A1    Sep. 13, 2018

(30) Foreign Application Priority Data

Nov. 30, 2015    (CN) .................. 2015 2 0975203 U

(51) Int. Cl.
*F21S 2/00* (2016.01)
*G02B 27/10* (2006.01)
(Continued)

(52) U.S. Cl.
CPC .............. *F21S 2/005* (2013.01); *F21V 5/045* (2013.01); *F21V 13/02* (2013.01); *F21V 14/06* (2013.01);
(Continued)

(58) Field of Classification Search
CPC .......... F21S 2/005; G02B 27/10; F21V 5/045; F21V 14/06; F21V 13/02; F21Y 2115/10;
(Continued)

(56) References Cited

U.S. PATENT DOCUMENTS

| 2003/0058532 A1* | 3/2003 | Suzuki ..................... G02B 3/08 |
| | | 359/455 |
| 2005/0036120 A1* | 2/2005 | Hirata .................. G03B 21/006 |
| | | 353/102 |

(Continued)

FOREIGN PATENT DOCUMENTS

| CN | 101988983 A | 3/2011 |
| CN | 103116197 A | 5/2013 |

(Continued)

OTHER PUBLICATIONS

Zhu et al., Chinese patent application publication CN20322386, Oct. 2013, machine translation.*

(Continued)

*Primary Examiner* — Tracie Y Green
(74) *Attorney, Agent, or Firm* — Seed Intellectual Property Law Group LLP

(57) ABSTRACT

A lighting device includes a polychromatic light source for emitting light in a plurality of colors, a light filter, and an optical element, wherein the light filter and the optical element are sequentially provided in an optical path of the polychromatic light source; a through hole is provided in the light filter, and the through hole has a size smaller than that of light spots of the polychromatic light source reaching the through hole; and the optical element is used for adjusting the light spots. Since the through hole has a size smaller than that of the light spots of the polychromatic light source reaching the through hole, the light filter can block stray light around the light spots such that more uniform portion (Continued)

of the light spots passes through the through hole, thereby improving the light-emitting effect of the lighting device.

12 Claims, 3 Drawing Sheets

(51) Int. Cl.
    *F21V 5/04*         (2006.01)
    *F21V 14/06*       (2006.01)
    *F21V 13/02*       (2006.01)
    *F21Y 113/10*      (2016.01)
    *F21Y 105/00*      (2016.01)
    *F21W 131/406*    (2006.01)
    *F21Y 115/10*      (2016.01)

(52) U.S. Cl.
    CPC ....... G02B 27/10 (2013.01); *F21W 2131/406* (2013.01); *F21Y 2105/00* (2013.01); *F21Y 2113/10* (2016.08); *F21Y 2115/10* (2016.08)

(58) Field of Classification Search
    CPC ............. F21Y 2113/10; F21Y 2105/00; F21W 2131/406
    See application file for complete search history.

(56) References Cited

U.S. PATENT DOCUMENTS

2009/0257040 A1* 10/2009 Dinger ............... G02B 27/0905
                                                 355/70
2016/0334636 A1* 11/2016 Xiao ...................... G02B 27/46

FOREIGN PATENT DOCUMENTS

| CN | 103148443 A | 6/2013 |
| CN | 203178572 U | 9/2013 |
| CN | 203223863 U | 10/2013 |
| CN | 2014-117704 | * 7/2014 |
| CN | 205299189 U | 6/2016 |

OTHER PUBLICATIONS

Translation of search opnion PCTCN2016107942 dated Jul. 2018.*
WO 2014-117704, machine translation (Year: 2014).*
International Search Report for PCT/CN2016/107942, dated Mar. 15, 2017, 2 pages.

* cited by examiner

LIGHTING DEVICE HAVING POLYCHROMATIC LIGHT SOURCE AND OPTICAL ELEMENT WITH LIGHT FILTER HAVING THROUGH HOLE

BACKGROUND

Technical Field

The present disclosure relates to the field of optical technology, and in particular, to a lighting device.

Description of the Related Art

As illustrated in FIG. 1, an existing lighting system comprises a polychromatic light source 101, a fly-eye lens 102, and a Fresnel lens 103, wherein the polychromatic light source 101 comprises LED light sources in a plurality of colors, the fly-eye lens 102 is used for blurring and diffusing light spots, and the Fresnel lens 103 plays a role for aiding the diffusion and convergence of light.

BRIEF SUMMARY

A problem is seen in the prior art. The polychromatic light source 101 is formed by packaging LED chips that emit light in a plurality of colors, such as LED chips emitting red light, LED chips emitting green light, and LED chips emitting blue light. As a result, non-uniform stray light with red light at the top and green light at the bottom emerges around light spots emitted from the polychromatic light source 101, leading to poor light-emitting effect of the lighting system.

In view of this, the present disclosure provides a lighting device to solve the problem of poor light-emitting effect of a lighting device due to non-uniform light spots in the prior art.

In at least one embodiment, the present disclosure provides a lighting device comprising a polychromatic light source for emitting light in a plurality of colors, a light filter, and an optical element, wherein the light filter and the optical element are sequentially provided in an optical path of the polychromatic light source, a through hole is provided in the light filter, and the through hole is smaller than light spots of the polychromatic light source reaching the through hole from the polychromatic light source, and the optical element is usable to adjust the light spots.

In various embodiments, the lighting device further comprises a Fresnel lens located on one side, away from the polychromatic light source, of the optical element, and sizes of the light spots of the lighting device are adjusted through adjusting a position relationship between the Fresnel lens and the optical element.

In various embodiments, the shape of the through hole corresponds to the shape of the light spots, and the shape of the through hole is a circle or a regular polygon.

In various embodiments, the optical element is located at a focus point of the polychromatic light source.

In various embodiments, the optical element comprises a lens.

In various embodiments, the lens is located between the light filter and the Fresnel lens, or the lens is located between the light filter and the polychromatic light source.

In various embodiments, the optical element comprises a plurality of lenses.

In various embodiments, the plurality of lenses are located between the light filter and the Fresnel lens or between the polychromatic light source and the light filter, or some lenses are located between the polychromatic light source and the light filter and other lenses are located between the light filter and the Fresnel lens.

In various embodiments, the lighting device further comprises a fly-eye lens.

In various embodiments, the fly-eye lens is located between the polychromatic light source and the light filter, or the fly-eye lens is located between the light filter and the Fresnel lens.

In the lighting device provided by the present disclosure, the light filter with the through hole is provided in the optical path of the polychromatic light. Since the through hole has a size smaller than that of the light spots of the polychromatic light source reaching the through hole, the light filter can block stray light around the light spots such that more uniform portion of the light spots passes through the through hole, thereby improving the light-emitting effect of the lighting device.

BRIEF DESCRIPTION OF THE DRAWINGS

In order to more clearly illustrate embodiments of the present disclosure, the drawings needed in the description of the embodiments will be introduced briefly below. It is apparent that the drawings described below are merely embodiments of the present disclosure, and those of ordinary skill in the art can also obtain other drawings according to the provided drawings without making creative efforts.

DETAILED DESCRIPTION

Embodiments of the present disclosure will be clearly and completely described below with reference to the drawings in the embodiments of the present disclosure. Obviously, the described embodiments are just some embodiments of the present disclosure instead of all embodiments. All other embodiments obtained by one skilled in the art based on the embodiments in the present disclosure without contributing any inventive labor shall be included in the protection scope of the present disclosure.

Figure 1:
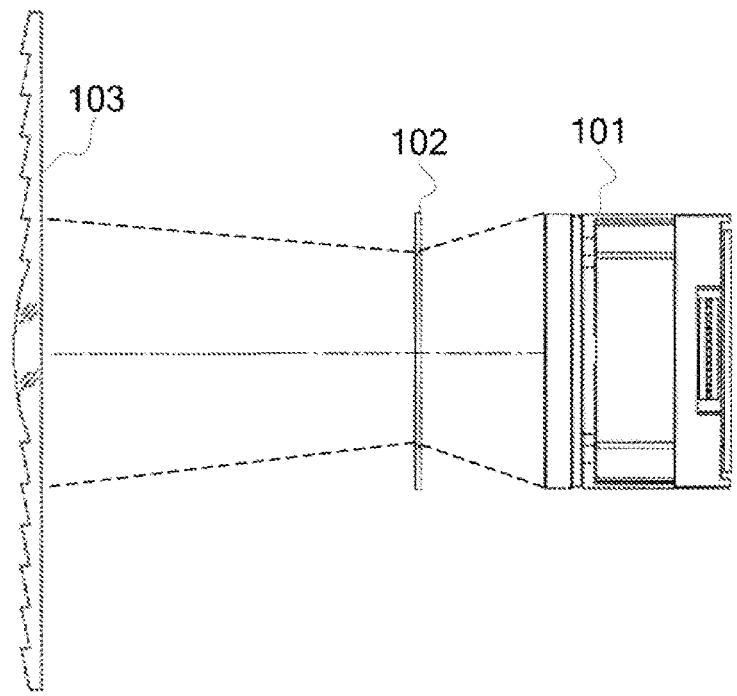
FIG. 1 illustrates a structural schematic view of an existing lighting device.
Figure 2:
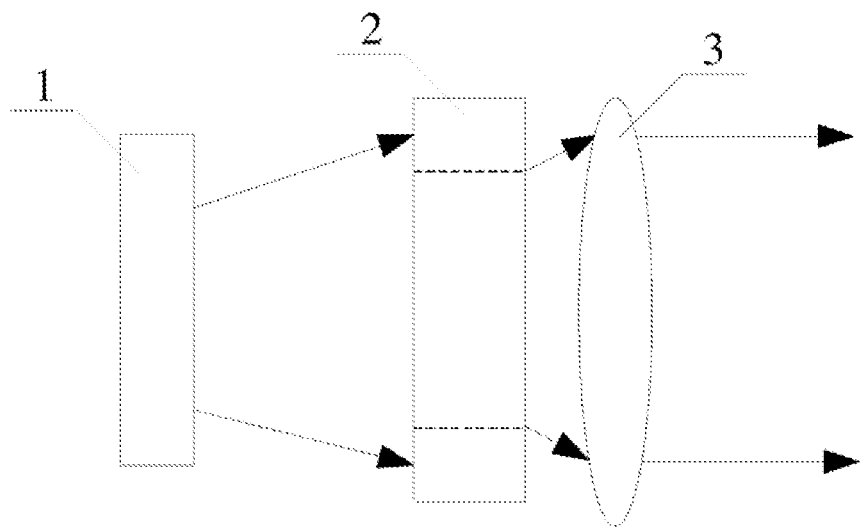
FIG. 2 illustrates a structural schematic view of a lighting device provided by one embodiment of the present disclosure.

One embodiment of the present disclosure provides a lighting device, which may be used as a projector lamp, a stage lamp, etc. As illustrated in FIG. 2, a structural schematic view of a lighting device provided by this embodiment comprises a polychromatic light source 1, a light filter 2, and a Fresnel lens 3.

Herein, the polychromatic light source 1 comprises a light source module and a light receiving element.

LED light sources in a plurality of colors are packaged in the light source module. The LED light sources in the plurality of colors emit light in different colors which can be combined to form white light for lighting. For example, the light source module has a red LED light source, a green LED light source, and a blue LED light source, and red light, green light, and blue light emitted by the three LED light sources can be combined to form white light for lighting. Certainly, the present disclosure is not limited thereto; and in other embodiments, the light source module may also comprise a blue LED light source, a yellow LED light source, etc.

The light receiving element is located on a light emitting surface of the light source module, and is used for converging light emitted from the light source module so that the light emitted from the LED light sources on the light source module in all directions converge to a focus point of the polychromatic light source 1. Alternatively, the light receiving element is a converging lens or the like.

Figure 3:
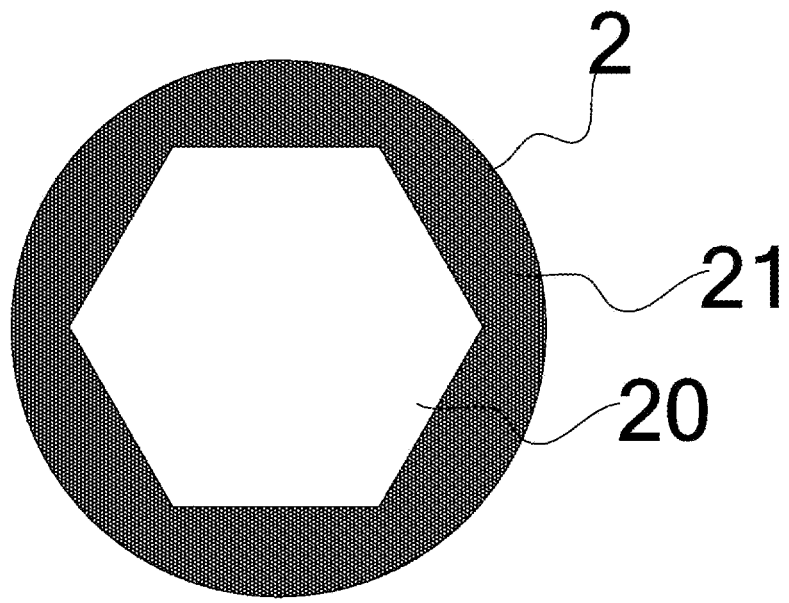
FIG. 3 illustrates a planar schematic view of a light filter provided by one embodiment of the present disclosure.

In this embodiment, a through hole is provided on the light filter 2, and the through hole has a size smaller than that of light spots of the polychromatic light source 1 reaching the through hole. Referring to FIG. 3, the light filter 2 comprises a through hole 20 with a preset shape and a light-tight area 21 around the through hole 20. Herein, the through hole 20 is used for transmitting light and the light-tight area 21 is used for reflecting or absorbing light, so as to block the stray light around the light spot by the light-tight area 21 and improve the uniformity of a light beam transmitted through the through hole 20. Since the polychromatic light source 1 consists of LED light sources in a plurality of colors, non-uniform stray light with red light at the top and green light at the bottom emerges around the light spot. If this non-uniform light is not removed, a very great influence will be caused to the light emitting effect of the lighting device. Therefore, in this embodiment, the stray light is blocked through the light filter 2 with the through hole.

Figure 4:
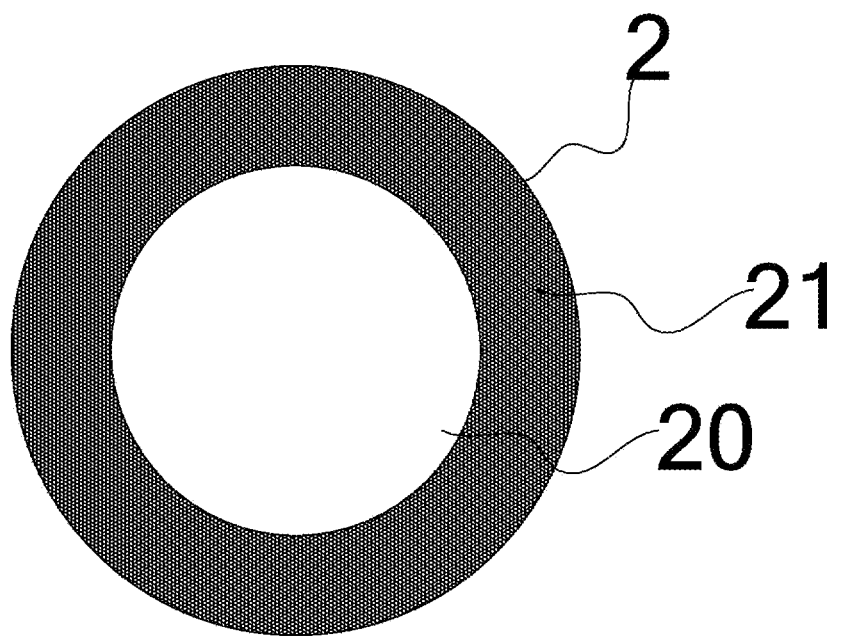
FIG. 4 illustrates a planar schematic view of another light filter provided by one embodiment of the present disclosure.

It needs to be further stated that the preset shape of the through hole 20 is the same as or similar to the shape of the light spot. In order to decrease the light loss, the size of the through hole 20 shall be slightly smaller than the size of the light spot. Alternatively, the preset shape of the through hole 20 may be a regular polygon such as a regular hexagon as illustrated in FIG. 3, and may also be a circle as illustrated in FIG. 4. Further, the diameter range of the preset shape is 30 mm-32 mm.

In this embodiment, the optical element comprises at least one lens 3 used for adjusting the light spot to improve the uniformity of the light spot. Since an image is formed via the polychromatic light source 1 at a focus point and the lens 3 can change the light emitting angle of the light beam, i.e., can play a certain role for converging light, the lens 3 can enable the smallest light spot of the light beam emitted finally from the lighting device to be smaller than the previous light spot and enable the largest light spot to be larger than the previous light spot.

In addition, the shorter the distance between the lens 3 and the focus point of the polychromatic light source 1 is, the better the light homogenizing effect is and the larger the angle range is. In at least one embodiment, the lens 3 is located at the focus point of the polychromatic light source 1. The lens 3 located at the focus point can not only achieve light homogenization, but also change the position of the focus point and the light emitting angle of the Fresnel lens 4. When the distance between the Fresnel lens 4 and the polychromatic light source 1 is short, the position of the focus point of the Fresnel lens 4 can be changed through the lens 3 to allow the focus point of the light beam emitted through the Fresnel lens 4 to be far away from the light source module of the polychromatic light source 1 and be close to the focus point of the polychromatic light source 1, so as to enable the optimal light emitting effect of the lighting device.

It further needs to be stated that in any embodiment of the present disclosure, the lighting device may comprise a lens 3, which may be provided between the polychromatic light source 1 and the light filter 2, and may also be provided between the light filter 2 and the Fresnel lens 4. Certainly, the present disclosure is not limited thereto. In another embodiment, the lighting device may comprise a plurality of lenses. These lenses are provided between the polychromatic light source 1 and the light filter 2 and may also be provided between the light filter 2 and the Fresnel lens 4. Some of these lenses are provided between the polychromatic light source 1 and the light filter 2 and other lenses are provided between the light filter 2 and the Fresnel lens 4. In this case, when the distance between the polychromatic light source 1 and the Fresnel lens 4 is not changed, the size of the light spot of the light beam emitted from the lighting device may be adjusted by adjusting the position relationships among the plurality of lenses.

Figure 5:
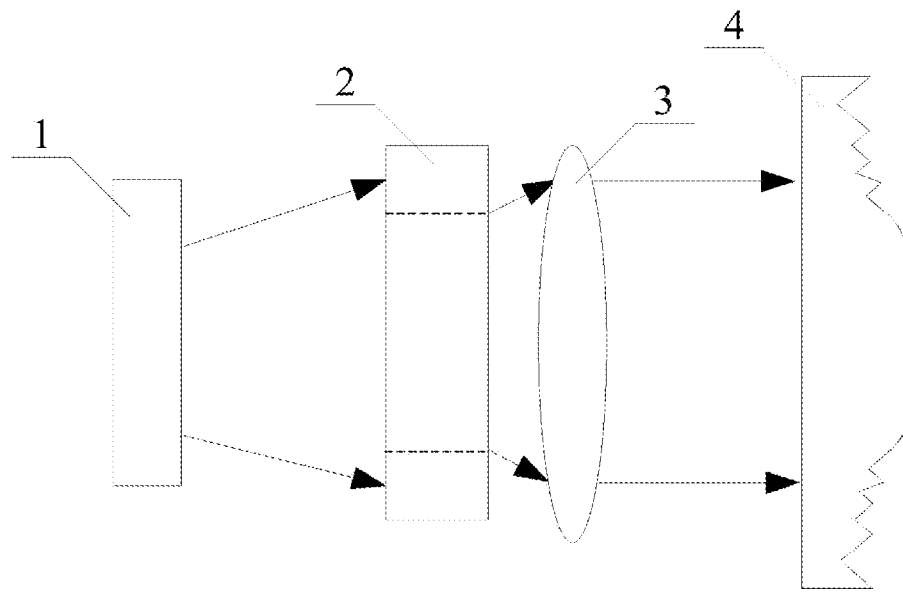
FIG. 5 illustrates a structural schematic view of a lighting device provided by another embodiment of the present disclosure.

In another embodiment of the present disclosure, as illustrated in FIG. 5, the lighting device may further comprise a Fresnel lens 4. The Fresnel lens 4 is located in an optical path of the polychromatic light source 1 and is located on one side, away from the polychromatic light source 1, of the optical element, i.e., the lens 3. The Fresnel lens 4 is used for converging the light beam emitted from the lens 3 and emitting the converged light beam. In this embodiment, the light spot of the lighting device may be adjusted by moving the Fresnel lens 4, i.e., adjusting the position relationship between the Fresnel lens 4 and the lens 3.

Figure 6:
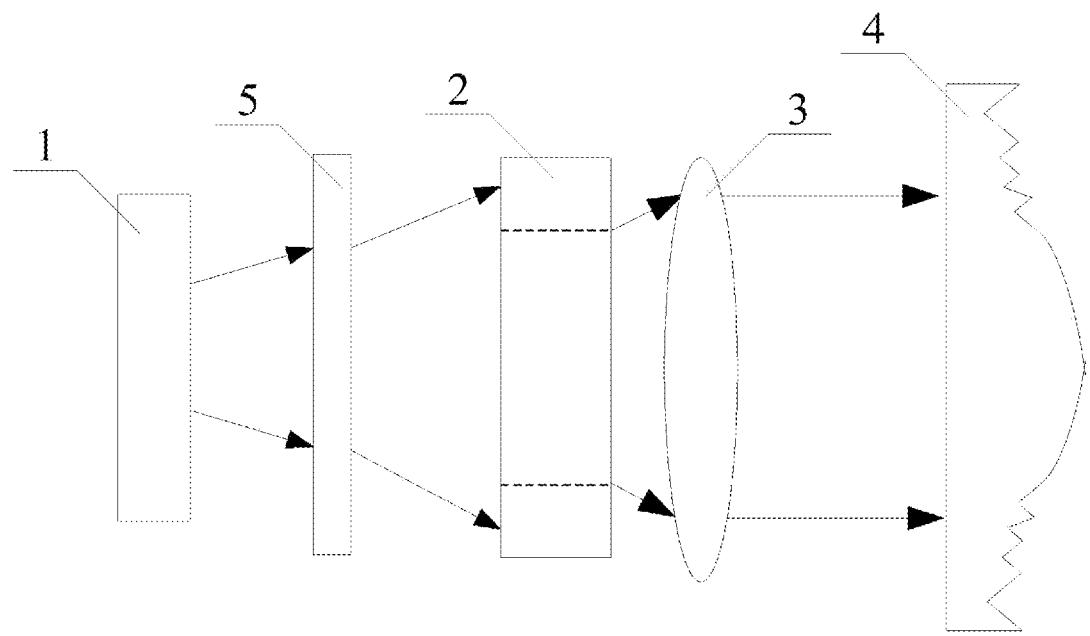
FIG. 6 illustrates a structural schematic view of a lighting device provided by still another embodiment of the present disclosure.

In another embodiment of the present disclosure, as illustrated in FIG. 6, the lighting device may further comprise a fly-eye lens 5 which may be provided between the polychromatic light source 1 and the light filter 2. In another embodiment of the present disclosure, the fly-eye lens 5 may also be provided between the light filter 2 and the Fresnel lens 4, so as to improve the light uniformity and lighting brightness of the lighting device via the fly-eye lens.

In the lighting device provided in this embodiment, a light filter with a through hole is provided in the optical path of the polychromatic light. Since the through hole has a size smaller than that of the light spot of the polychromatic light source reaching the through hole, the light filter can block stray light around the light spot such that a more uniform portion of the light spot passes through the through hole, thereby improving the light-emitting effect of the lighting device.

All embodiments in the description are described in a progressive way, with each focusing on parts that are different from other embodiments. Refer to the embodiments for parts that are the same or similar. The above-mentioned description of the disclosed embodiments can enable one skilled in the art to implement or use the present disclosure. Various modifications to these embodiments are obvious to one skilled in the art. General principles defined in this disclosure can be applied to other embodiments without departing from the spirit or scope of the present disclosure. Therefore, the present disclosure is not limited to these embodiments described herein but covers the widest range which is consistent with the principle and novel features disclosed herein.

The invention claimed is:

1. A lighting device, comprising:
a polychromatic light source emitting light in a plurality of colors, the polychromatic light source having a focus point;
a light filter; and
an optical element, wherein:
the light filter and the optical element are sequentially provided in an optical path of the polychromatic light source;
a through hole is provided in the light filter, and the through hole is smaller than light spots of the polychromatic light source reaching the through hole from the polychromatic light source;
the optical element is used for adjusting the light spots;
the light filter is configured to block stray light of the polychromatic light source; and
the optical element is located at or near the focus point of the polychromatic light source,
wherein the lighting device further comprises a Fresnel lens located on one side of the optical element, away from the polychromatic light source, and sizes of the light spots of the lighting device are adjusted through adjusting a position relationship between the Fresnel lens and the optical element.

2. The lighting device according to claim 1, wherein the shape of the through hole corresponds to the shape of the light spots; and
the shape of the through hole is a circle or a regular polygon.

3. The lighting device according to claim 2, wherein the optical element comprises a lens.

4. The lighting device according to claim 3, wherein the lens is located between the light filter and the Fresnel lens.

5. The lighting device according to claim 2, wherein the optical element comprises a plurality of lenses.

6. The lighting device according to claim 5, wherein the plurality of lenses are located between the light filter and the Fresnel lens.

7. The lighting device according to claim 4, wherein the lighting device further comprises a fly-eye lens.

8. The lighting device according to claim 7, wherein the fly-eye lens is located between the polychromatic light source and the light filter.

9. The lighting device according to claim 7, wherein the fly-eye lens is located between the light filter and the Fresnel lens.

10. The lighting device according to claim 3, wherein the lens is located between the light filter and the polychromatic light source.

11. The lighting device according to claim 5, wherein the plurality of lenses are located between the polychromatic light source and the light filter.

12. The lighting device according to claim 5, wherein some lenses of the plurality of lenses are located between the polychromatic light source and the light filter and other lenses of the plurality of lenses are located between the light filter and the Fresnel lens.

\* \* \* \* \*

UNITED STATES PATENT AND TRADEMARK OFFICE
CERTIFICATE OF CORRECTION

PATENT NO. : 10,746,357 B2
APPLICATION NO. : 15/779818
DATED : August 18, 2020
INVENTOR(S) : Siyuan Zou et al.

Page 1 of 1

It is certified that error appears in the above-identified patent and that said Letters Patent is hereby corrected as shown below:

In the Claims

Column 6, Claim 3, Line 1:
"claim 2," should read: --claim 1,--.

Column 6, Claim 5, Line 5:
"claim 2," should read: --claim 1,--.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*